US012663303B2

(12) United States Patent
Smith et al.

(10) Patent No.: US 12,663,303 B2
(45) Date of Patent: Jun. 23, 2026

(54) VOLUME DETERMINATION SYSTEM, A VEHICLE HAVING A VOLUME DETERMINATION SYSTEM, AND METHODS OF OPERATING SUCH A VEHICLE

(71) Applicant: AGCO Corporation, Duluth, GA (US)

(72) Inventors: Evan Thomas Smith, Spirit Lake, IA (US); Michael J. Runck, Jackson, IA (US)

(73) Assignee: AGCO Corporation, Duluth, GA (US)

( * ) Notice: Subject to any disclaimer, the term of this patent is extended or adjusted under 35 U.S.C. 154(b) by 358 days.

(21) Appl. No.: 18/462,791

(22) Filed: Sep. 7, 2023

(65) Prior Publication Data

US 2024/0142288 A1 May 2, 2024

Related U.S. Application Data

(60) Provisional application No. 63/381,690, filed on Oct. 31, 2022.

(51) Int. Cl.
*G01F 22/02* (2006.01)

(52) U.S. Cl.
CPC .................................. *G01F 22/02* (2013.01)

(58) Field of Classification Search
CPC .......... G01F 22/00; G01F 22/02; G01F 22/20; G01F 23/2928
See application file for complete search history.

(56) References Cited

U.S. PATENT DOCUMENTS

| | | | |
|---|---|---|---|
| 5,630,625 A | 5/1997 | Shaw | |
| 9,079,470 B2 | 7/2015 | Slawson | |
| 10,145,717 B2 * | 12/2018 | Romstoeck | ............. G01C 9/00 |
| 11,560,031 B2 * | 1/2023 | Niedert | ............... B60G 17/021 |
| 12,135,571 B2 * | 11/2024 | Faust | .................... A01B 76/00 |
| 12,312,233 B2 * | 5/2025 | Dudar | ................... B67D 7/221 |

(Continued)

FOREIGN PATENT DOCUMENTS

| | | |
|---|---|---|
| DE | 102019118149 A1 | 1/2021 |
| DE | 102019217199 A1 | 5/2021 |

(Continued)

OTHER PUBLICATIONS

UK Patent Office, Search Report for related GB Application No. GB2216824.9, dated May 10, 2023, 4 pages.

*Primary Examiner* — John Fitzgerald

(57) ABSTRACT

A vehicle includes a holding tank including a plurality of segments, each configured to hold an individual product, a plurality of suspension assemblies supporting the vehicle, and a volume determination system. The volume determination system is configured to receive image data from at least one imager system of the vehicle during a first filling process of a first segment of the holding tank, analyze the received image data to identify a termination of the first filling process, responsive to identifying the termination of the first filling process, receive first pressure measurements from the plurality of suspension assemblies, based at least partially on the received first pressure measurements, determine a volume of a first product within the first segment of the holding tank, and cause the determined volume of the product within the first segment of the plurality of segments to be output to an operator of the vehicle.

19 Claims, 10 Drawing Sheets

(56) References Cited

U.S. PATENT DOCUMENTS

| | | | |
|---|---|---|---|
| 12,358,779 B2* | 7/2025 | Robinson | B67D 7/04 |
| 2010/0211356 A1 | 8/2010 | Minoshima et al. | |
| 2013/0045067 A1 | 2/2013 | Pickett et al. | |
| 2013/0120579 A1 | 5/2013 | Mlitsuta et al. | |
| 2020/0211356 A1 | 7/2020 | Sporer | |
| 2022/0000013 A1* | 1/2022 | Harmon | G01F 22/00 |
| 2022/0364900 A1* | 11/2022 | Gingold | G01F 23/243 |
| 2022/0373384 A1 | 11/2022 | Spendlove et al. | |
| 2023/0048720 A1* | 2/2023 | Luxford | G01S 7/027 |
| 2023/0159182 A1* | 5/2023 | Tepper | G01F 23/292 |
| | | | 73/432.1 |
| 2023/0213371 A1* | 7/2023 | Katsura | G01B 11/24 |
| 2024/0142287 A1* | 5/2024 | Smith | G01F 22/02 |
| 2024/0142289 A1* | 5/2024 | Smith | G01F 22/02 |
| 2024/0351809 A1* | 10/2024 | Davis | B65G 43/08 |

FOREIGN PATENT DOCUMENTS

| | | | |
|---|---|---|---|
| EP | 2275287 A2 | 1/2011 | |
| EP | 2532220 A1 | 12/2012 | |
| JP | H0261717 B2 | 1/1990 | |
| WO | 2017182768 A1 | 10/2017 | |
| WO | 2022175769 A1 | 8/2022 | |

* cited by examiner

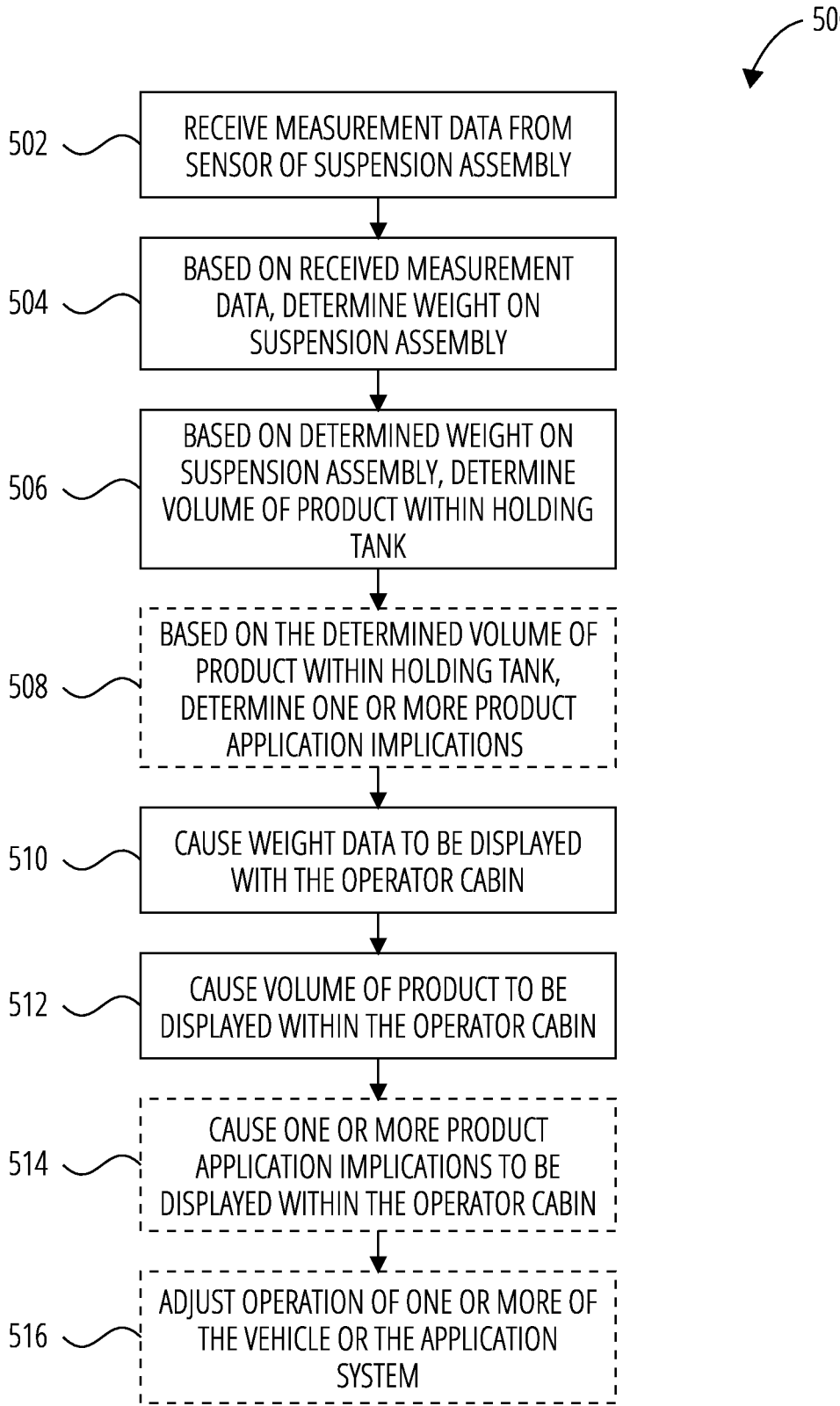

500

502 — RECEIVE MEASUREMENT DATA FROM SENSOR OF SUSPENSION ASSEMBLY

504 — BASED ON RECEIVED MEASUREMENT DATA, DETERMINE WEIGHT ON SUSPENSION ASSEMBLY

506 — BASED ON DETERMINED WEIGHT ON SUSPENSION ASSEMBLY, DETERMINE VOLUME OF PRODUCT WITHIN HOLDING TANK

508 — BASED ON THE DETERMINED VOLUME OF PRODUCT WITHIN HOLDING TANK, DETERMINE ONE OR MORE PRODUCT APPLICATION IMPLICATIONS

510 — CAUSE WEIGHT DATA TO BE DISPLAYED WITH THE OPERATOR CABIN

512 — CAUSE VOLUME OF PRODUCT TO BE DISPLAYED WITHIN THE OPERATOR CABIN

514 — CAUSE ONE OR MORE PRODUCT APPLICATION IMPLICATIONS TO BE DISPLAYED WITHIN THE OPERATOR CABIN

516 — ADJUST OPERATION OF ONE OR MORE OF THE VEHICLE OR THE APPLICATION SYSTEM

FIG. 5

VOLUME DETERMINATION SYSTEM, A VEHICLE HAVING A VOLUME DETERMINATION SYSTEM, AND METHODS OF OPERATING SUCH A VEHICLE

CROSS-REFERENCE TO RELATED APPLICATION

This application claims the benefit of the filing date of U.S. Provisional Patent Application 63/381,690, filed Oct. 31, 2022, the entire disclosure of which is incorporated herein by reference.

FIELD

Embodiments of the present disclosure relate to mobile machines, such as self-propelled agricultural machines and similar vehicles.

BACKGROUND

Some vehicles are configured to be operated in fields among row crops. Application machines such as self-propelled sprayers, for example, may have a holding tank for holding a product to be applied to crops and a boom that extends outwardly from the vehicle to apply the product to the crop as the machine travels through the field. While filling the holding tank with a product and during an application process (e.g., a fertilizing process), it is often difficult to ascertain an amount of product actually within the holding tank. This can result in operators running out of product prior to finishing an application process and/or an operator overfilling the holding tank and leaving excess product in the holding tank post an application process. Accordingly, time is often wasted on hailing tender trucks too soon or too late during an application process. Moreover, safety concerns arise when too much product is loaded into the holding tank of the vehicle.

BRIEF SUMMARY

Embodiments include a vehicle having a holding tank that includes a plurality of segments, each segment configured to hold an individual product. The vehicle also includes a plurality of suspension assemblies supporting the vehicle, at least one processor, and at least one non-transitory computer-readable storage medium storing instructions thereon that, when executed by the at least one processor, cause the volume determination system to receive image data from at least one imager system of the vehicle during a first filling process of a first segment of the plurality of segments of the holding tank, analyze the received image data to identify a termination of the first filling process of the first segment of the plurality of segments of the holding tank, responsive to identifying the termination of the first filling process, receive first pressure measurements from the plurality of suspension assemblies, based at least partially on the received first pressure measurements, determine a volume of a first product within the first segment of the plurality of segments of the holding tank, and cause the determined volume of the product within the first segment of the plurality of segments to be output to an operator of the vehicle.

The volume determination system may further include instructions that, when executed by the at least one processor, cause the volume determination system to analyze the received image data to identify an initiation of a second filling process of a second segment of the plurality of segments of the holding tank, analyze the received image data to identify a termination of the second filling process of the second segment of the plurality of segments of the holding tank, responsive to identifying the termination of the second filling process, receive second pressure measurements from the plurality of suspension assemblies, based at least partially on the received second pressure measurements, determine a volume of the second product within the second segment of the plurality of segments of the holding tank, and cause the determined volume of the second product within the second segment of the plurality of segments to be output to the operator of the vehicle.

The volume determination system may further include instructions that, when executed by the at least one processor, cause the volume determination system to receive usage data related to an application of the first product during an application process.

The vehicle may also include an operator cabin, and wherein causing the determined volume of the first product within the first segment of the plurality of segments to be output to the operator of the vehicle includes causing the determined volume of the first product within the first segment of the plurality of segments to be displayed on a display panel of the operator cabin.

Each suspension assembly of the plurality of suspension assemblies may include at least one suspension cylinder mounted between a chassis and a respective wheel of the vehicle, a hydraulic fluid, a pump for pressuring the hydraulic fluid within the at least one suspension cylinder, and at least one pressure sensor interfacing with the hydraulic fluid and operably coupled to the volume determination system.

The volume determination system may further include instructions that, when executed by the at least one processor, cause the volume determination system to receive pressure measurement prior to the first filling process.

Determining the volume of the first product within the first segment of the plurality of segments of the holding tank of the vehicle may include determining the volume of the first product within the first segment of the holding tank of the vehicle based at least partially on a known density of the first product.

The volume determination system may further include instructions that, when executed by the at least one processor, cause the volume determination system to adjust operation of the vehicle based at least partially on the determined volume of the first product within the first segment of the plurality of segments of the holding tank.

The volume determination system may further include instructions that, when executed by the at least one processor, cause the volume determination system to provide volume data to a remote device.

The volume determination system may further include instructions that, when executed by the at least one processor, cause the volume determination system to a determine an area over which the first product can be applied based at least partially on the determined volume of the first product within the first segment of the plurality of segments of the holding tank.

Receiving usage data related to the application of the first product may include receiving data related to at least one of a time period for which the first product has been applied or an application rate at which the first product has been applied.

The volume determination system may further include instructions that, when executed by the at least one processor, cause the volume determination system to receive third pressure measurements from the plurality of suspension assemblies after the application of the first product.

The volume determination system may further include instructions that, when executed by the at least one processor, cause the volume determination system to update the determined volume of the first product based at least partially on the received third pressure measurements and the received usage data related to the application of the first product.

Embodiments also include a method that includes receiving image data from an imager system mounted to a holding tank of the vehicle, analyzing the received image data to identify an initiation of a first process of filling a first segment of the holding tank of the vehicle with a first product, analyzing the received image data to identify a termination of the first process of filling the first segment of the holding tank of the vehicle, responsive to identifying the termination of the first process of filling the first segment, receiving first pressure data from suspension assemblies of the vehicle, based at least partially on the received first pressure data, determining a volume of a first product within the first segment of the holding tank of the vehicle, and causing the determined volume of the first product to be output to an operator.

The method may also include analyzing the received image data to identify an initiation of a second process of filling a second segment of the holding tank of the vehicle with a second product, analyzing the received image data to identify a termination of the second process of filling the second segment of the holding tank of the vehicle, responsive to identifying the termination of the second process of filling the first segment, receiving second pressure data from the suspension assemblies of the vehicle, based at least partially on the received second pressure data, determining a volume of the second product within the second segment of the holding tank of the vehicle, and causing the determined volume of the second product to be output to the operator.

Causing the determined volume of the first product to be output to the operator may include causing the determined volume of the first product to be output within an operator cabin.

Causing the determined volume of the first product to be output to the operator may include causing the determined volume of the first product to be output via a device remote from the vehicle.

The method may also include at least substantially continuously receiving updated pressure data, and at least substantially continuously updating the determined volume of the first product.

Causing the determined volume of the first product to be output to the operator may include causing the determined volume of the first product to be displayed on a display panel and to be associated with the first segment of the holding tank on the display panel.

Embodiments further include a volume determination system that includes at least one processor and at least one non-transitory computer-readable storage medium storing instructions thereon that, when executed by the at least one processor, cause the volume determination system to detect a termination of process of filling at least one segment of a holding tank of a vehicle with a respective product, responsive to detecting the termination of the process of filling the at least one segment of the holding tank, receive a pressure measurement from at least one suspension assembly of the vehicle, based at least partially on the received pressure measurement, determine a volume of the respective product within the at least one segment of the holding tank of the vehicle, and cause the determined volume of the respective product to be output to an operator of the vehicle. Other technical features may be readily apparent to one skilled in the art from the following figures, descriptions, and claims.

Within the scope of this application it should be understood that the various aspects, embodiments, examples and alternatives set out herein, and individual features thereof may be taken independently or in any possible and compatible combination. Where features are described with reference to a single aspect or embodiment, it should be understood that such features are applicable to all aspects and embodiments unless otherwise stated or where such features are incompatible.

BRIEF DESCRIPTION OF THE DRAWINGS

While the specification concludes with claims particularly pointing out and distinctly claiming what are regarded as embodiments of the present disclosure, various features and advantages may be more readily ascertained from the following description of example embodiments when read in conjunction with the accompanying drawings, in which:

FIG. 5 shows a flowchart of a method of controlling operation of a vehicle according to embodiments of the disclosure;

DETAILED DESCRIPTION

Figure 1A:
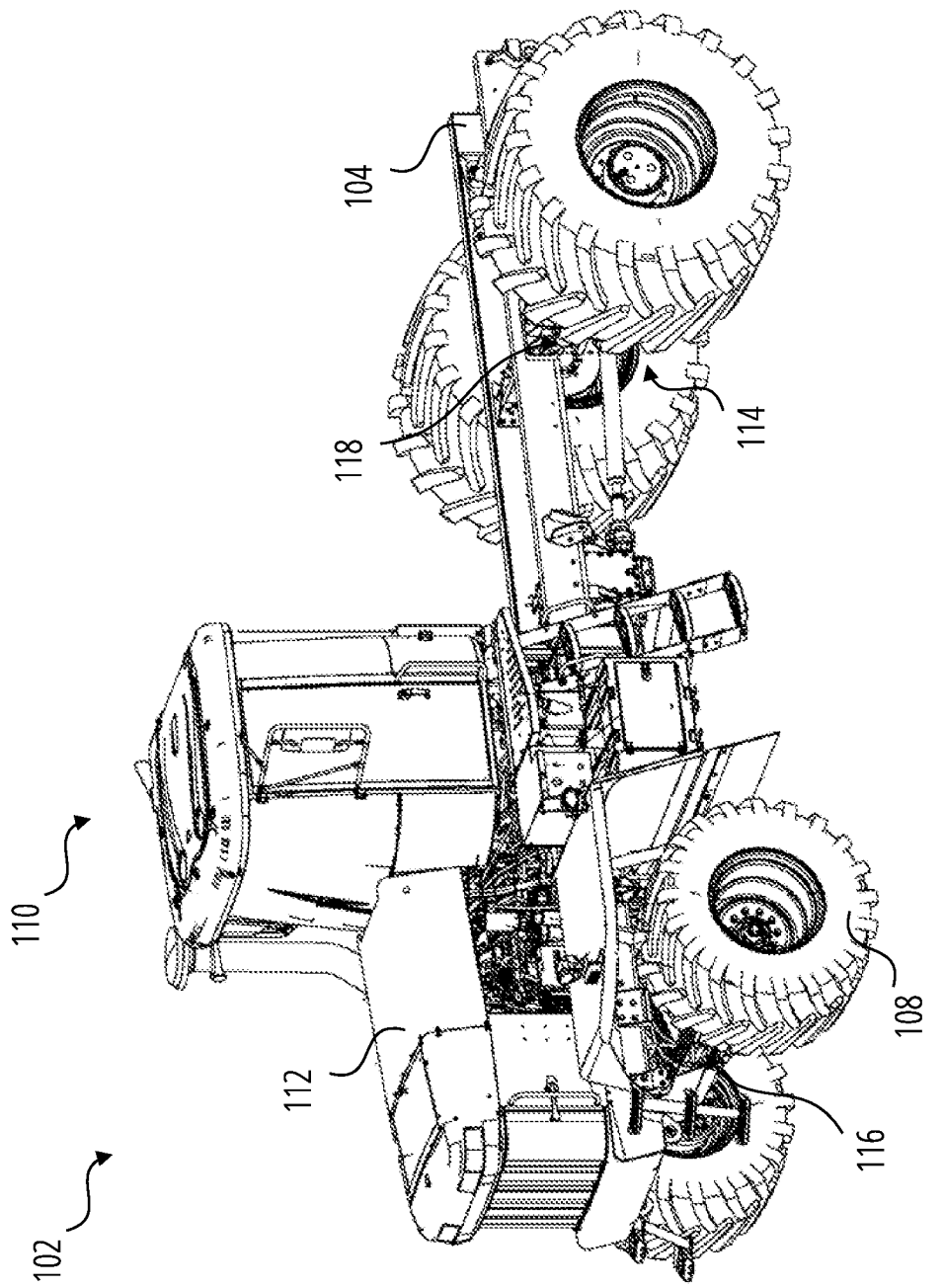
FIG. 1A shows a perspective view of a vehicle having a product volume determination system according to embodiments of the disclosure.

Illustrations presented herein are not meant to be actual views of any particular vehicle, application system, agricultural implement, component, or system, but are merely idealized representations that are employed to describe embodiments of the disclosure. Additionally, elements common between figures may retain the same numerical designation for convenience and clarity.

The following description provides specific details of embodiments. However, a person of ordinary skill in the art will understand that the embodiments of the disclosure may be practiced without employing many such specific details. Indeed, the embodiments of the disclosure may be practiced in conjunction with conventional techniques employed in the industry. In addition, the description provided below does not include all the elements that form a complete structure or assembly. Only those process acts and structures necessary to understand the embodiments of the disclosure are described in detail below. Additional conventional acts and structures may be used. The drawings accompanying the application are for illustrative purposes only, and are thus not drawn to scale.

As used herein, the terms "comprising," "including," "containing," "characterized by," and grammatical equivalents thereof are inclusive or open-ended terms that do not exclude additional, unrecited elements or method steps, but also include the more restrictive terms "consisting of" and "consisting essentially of" and grammatical equivalents thereof.

As used herein, the singular forms following "a," "an," and "the" are intended to include the plural forms as well, unless the context clearly indicates otherwise.

As used herein, the term "may" with respect to a material, structure, feature, or method act indicates that such is contemplated for use in implementation of an embodiment of the disclosure, and such term is used in preference to the more restrictive term "is" so as to avoid any implication that other compatible materials, structures, features, and methods usable in combination therewith should or must be excluded.

As used herein, the term "configured" refers to a size, shape, material composition, and arrangement of one or more of at least one structure and at least one apparatus facilitating operation of one or more of the structure and the apparatus in a predetermined way.

As used herein, any relational term, such as "first," "second," "third," etc. is used for clarity and convenience in understanding the disclosure and accompanying drawings, and does not connote or depend on any specific preference or order, except where the context clearly indicates otherwise.

As used herein, the term "substantially" in reference to a given parameter, property, or condition means and includes to a degree that one skilled in the art would understand that the given parameter, property, or condition is met with a small degree of variance, such as within acceptable manufacturing tolerances. By way of example, depending on the particular parameter, property, or condition that is substantially met, the parameter, property, or condition may be at least 90.0% met, at least 95.0% met, at least 99.0% met, or even at least 99.9% met.

As used herein, the term "about" used in reference to a given parameter is inclusive of the stated value and has the meaning dictated by the context (e.g., it includes the degree of error associated with measurement of the given parameter, as well as variations resulting from manufacturing tolerances, etc.).

As used herein, the term "and/or" includes any and all combinations of one or more of the associated listed items.

Embodiments include a vehicle (e.g., an applicator) for distributing a product over a soil surface and/or a crop within a field. As used herein, the term "product" refers to any solid material (e.g., dry material) and/or liquid that can be or is typically applied to (e.g., distributed on) a field and/or crop during an agricultural process. The vehicle may include a volume determination system as part of a central controller of the vehicle and/or part of a remote device (e.g., a central server) in communication with the central controller of the vehicle. The volume determination system may utilize pressure measurement data received or acquired from suspension assemblies of the vehicle to determine a weight of a product and a volume of the product within a holding tank of the vehicle. Furthermore, the volume determination system may cause the determined weight of the product and/or the determined volume of the product to be output (e.g., communicated) to an operator.

Embodiments include a holding tank having multiple discrete segments for holding individual (e.g., respective) products. The volume determination system may be further configured to determine the weight and/or volume of products within the individual segments of the holding tank and cause the determined weight of the products and/or the determined volume of the products of the individual segments to be output to an operator. Embodiments further include a vehicle having one or more imager systems that can be utilized to determine when a filling process (e.g., a process of adding one or more products to a segment of the holding tank) begins and the filling process ends. For instance, the volume determination system may utilize the one or more imager systems to detect when a filling process begins and/or when a filling process ends.

The vehicle and volume determination system of the disclosure may provide advantages over conventional vehicles with application systems and/or applicators for applying a product to a field or a crop. For example, during a refill process, the volume determination system described herein enables an operator to know when enough product has been loaded within a holding tank to cover a given application process (e.g., a remaining number of acres). Furthermore, during an application process, the volume determination system enables an operator to know, from an operator cabin of the vehicle, whether the holding tank has enough product remaining to cover the given application process (e.g., a remaining number of acres).

Moreover, prior to road travel, the volume determination system enables the operator to know if whether the vehicle is too heavy to travel on roadways and/or across a given bridge. Likewise, knowing the weight on axles of the vehicle may assist with on-road operations and enable the operator to determine whether the vehicle is within compliance with roadway regulations.

Additionally, knowing a volume and/or weight of product remaining in a holding tank of a vehicle allows the operator to optimize logistics of tender trucks by avoiding having tender trucks wait for the operator to finish a current application process (e.g., field) before knowing whether the holding tank has enough product remaining. Furthermore, knowing a volume and/or weight of product remaining in a holding tank of a vehicle allows the operator to send and/or hail a tender truck to refill if the holding tank does not have enough remaining product for the current application process. Moreover, knowing a volume and/or weight of product remaining in a holding tank of a vehicle allows the operator to send an en-route tender truck to another vehicle (e.g., another field) if additional product is not needed in order to finish a current application process. Likewise, knowing a volume and/or weight of product remaining in a holding tank of a vehicle allows the operator to divert a truck en-route to another vehicle (e.g., another field) to the vehicle itself if additional product is required to finish a current application process.

Moreover, knowing a volume and/or weight of product remaining in a holding tank of a vehicle encourages an operator to only load enough product into the holding tank to accomplish (e.g., complete) a current application process. As a result, the operator may avoid being overweight with excess product when transferring to a subsequent application process (e.g., travelling to a next field). Additionally, reducing excess product in the holding tank may result is lower fuel consumption, which leads to cost savings and lower emissions.

Additionally, tires, brakes, and other vehicle components are not typically designed to support a vehicle operating at a maximum road speed with holding tanks full of product. The volume determination system may limit maximum speeds of a vehicle based on a determined volume and/or weight of product in a holding tank of the vehicle in order to prevent overloading components and/or prevent unsatisfactory braking performance.

Furthermore, often self-propelled fertilizer applicators switch an application system mounted on the chassis between liquid and dry fertilizer systems seasonally. The volume determination system of the disclosure would be equally applicable and effective for both systems without requiring unique hardware for each system. Additionally, the volume determination system of the disclosure may help to protect the vehicle from unsafe weights or speeds if an owner operates or modifies the vehicle in a manner detrimental to safety.

Figure 1B:
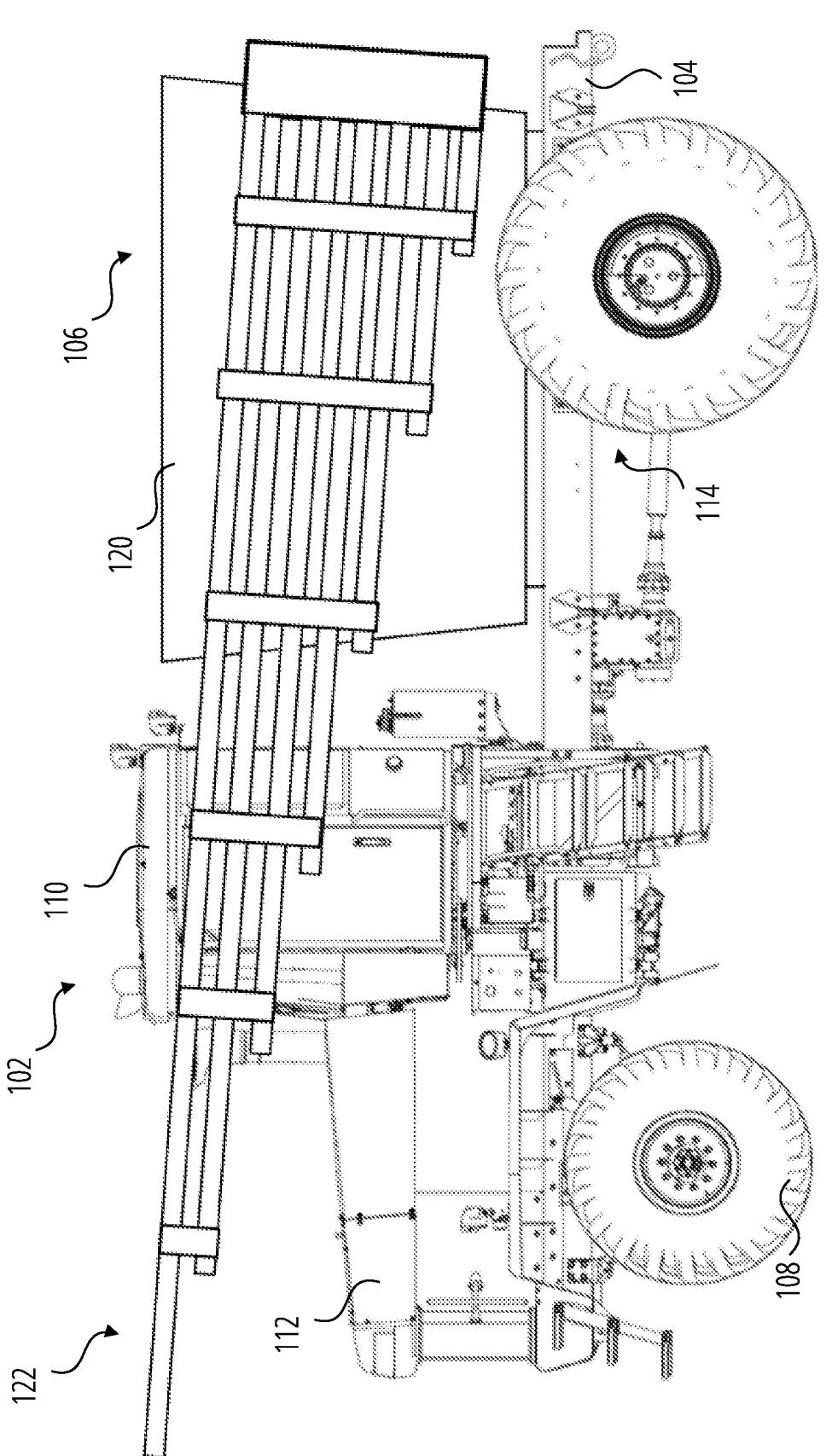
FIG. 1B shows a side view the vehicle of FIG. 1A.

FIG. 1A is a perspective view of a vehicle 102 (e.g., an applicator) according to embodiments of the disclosure. The vehicle 102 includes a system for determining a volume and/or weight of a product within a holding tank of the vehicle 102. The system 216 (FIG. 2) may be referred to herein as a "volume determination system 216." FIG. 1B is a side view of the vehicle 102 of FIG. 1A. Some components of the vehicle 102 have been omitted from FIG. 1A for simplicity of illustration and to better show features of the vehicle 102.

Referring to FIG. 1A and FIG. 1B together, the vehicle 102 may include an agricultural material applicator including a chassis 104, an application system 106, a plurality of wheels 108 or other ground-engaging elements supporting the chassis 104 above a ground surface, an operator cabin 110, and an engine compartment 112. A plurality of suspension assemblies 114 may be interposed between the wheels 108 and the chassis support of the chassis 104 and provide suspension and/or steering functions, as discussed in greater detail below. In some embodiments, the suspension assemblies 114 may further provide height adjustment. In some embodiments, the vehicle 102 may include a suspension assembly 114 for each wheel 108. In some embodiments, the vehicle 102 may include at least one suspension assembly 114 for each axle.

The vehicle 102 includes a pair of front wheels 108 coupled to a front axle 116 and a pair of rear wheels 108 coupled to a rear axle 118 of the appropriate size and shape to allow the vehicle 102 to travel among row crops with minimal crop disturbance. As used herein, a "wheel" includes an inner, rigid wheel and an outer, flexible tire mounted on the inner wheel, unless otherwise specified. The particular size, shape, and configuration of the wheels 108 may vary substantially from one embodiment to another. In some embodiments, the vehicle 102 may include ground-engaging elements other than wheels, such as tracks, skis, etc. Hereinafter, reference will be made to a "wheel 108" or "wheels 108" with the understanding that the illustrated wheels 108 may be replaced with other types of ground-engaging elements.

The application system 106 is supported on the chassis 104 and may be useful for distributing products (e.g., liquids and/or solids), such as fertilizer in a field. As shown in FIG. 1B, the application system 106 includes a holding tank 120 and a delivery system 122 for applying the product (e.g., liquids and/or solids) from the holding tank 120 to a crop or field. In embodiments where the holding tank 120 is configured to hold liquids, the holding tank 120 may have a capacity of between 200 gallons (757 l) and 2,600 gallons (9,842 l) and, more specifically, may have a capacity of 700 gallons (2,650 l), 900 gallons (3,410 l), 1,100 gallons (4,160 l), or 1,300 gallons (4,920 l). In some embodiments, the holding tank 120 may have a capacity of more than 2,600 gallons (9,842 l). In embodiments where the holding tank 120 is configured to hold solids and includes a solid product hopper, the holding tank 120 may have a capacity of between 20 cubic feet (0.57 cubic meters) and 400 cubic feet (11.32 cubic meters). Furthermore, while specific sizes of holding tanks are described above, the disclosure is not limited, and the holding tank 120 may include any size of holding tank. As is discussed in greater detail, data provided by the suspension assemblies 114 may be utilized to determine a volume of product (e.g., liquid and/or dry material) within the holding tank 120, which may provide useful information to an operator and may influence operation of the vehicle 102 and/or the application system 106.

In some embodiments related to liquid application, the delivery system 122 may include a laterally extending boom supporting hoses, pumps, and spray nozzles or similar components for dispersing or otherwise delivering the contents of the holding tank 120 to a crop. The boom may be configured to fold for transport. In some embodiments related to dry material application, the application system 106 may include a solid product hopper and a solid material spreader for dispersing particulate material from the solid product hopper, such as a pneumatic boom system, a pneumatic spreader, and/or one or more spinners.

Figure 2:
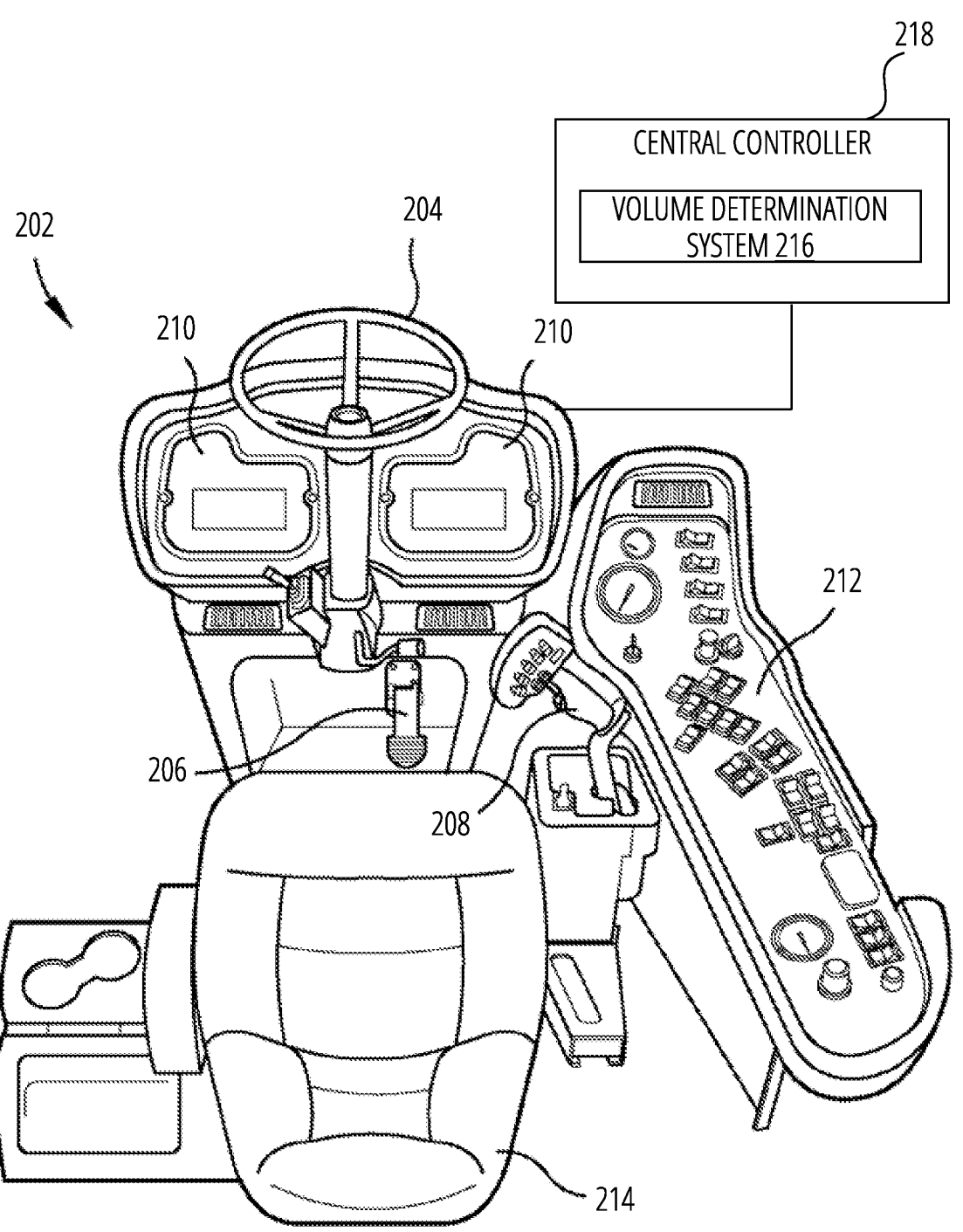
FIG. 2 shows portions of a cabin of the vehicle of FIG. 1A and FIG. 1B including one or more user interface elements allowing an operator to control the vehicle according to one or more embodiments of the disclosure.

FIG. 2 shows a simplified view of an interior of the operator cabin 110. The operator cabin 110 or "cab" is supported on the chassis 104 and may be positioned forward (as shown in FIG. 1B) of behind of the application system 106. The operator cabin 110 may include a control environment 202 which may include a steering wheel 204, one or more pedals 206, a drive lever 208, one or more electronic display panels 210, and a control panel 212 including buttons, switches, levers, gauges, and/or other user interface elements. The various components of the control environment 202 enable the operator to control the functions of the vehicle 102, including driving and operating the application system 106. The various user interface elements are positioned around and proximate a seat 214 for easy access by an operator during operation of the vehicle 102. In some embodiments, the control environment 202 may include a touchscreen display. For example, one or both of the electronic display panels 210 may be or include a touchscreen, or a display terminal with a touchscreen may be mounted on or near the control panel 212.

One or more elements of the control environment 202 may be operably coupled to a volume determination system 216 of a central controller 218. The central controller 218 may be configured to control one or more operations and devices of the vehicle 102 and/or the application system 106. The central controller 218 and the volume determination system 216 are described in greater detail below. The volume determination system 216 may include software and/or hardware for determining a weight and/or volume of a product within the holding tank 120 of the vehicle 102 based on pressure data received from the suspension assemblies 114 of the vehicle 102.

In some embodiments, the vehicle 102 may not include an operator cabin 110 or may include a limited operator cabin 110. As a non-limiting example, the vehicle 102 may be an autonomous machine, and the operator cabin 110 may be omitted. In such embodiments, the central controller 218 may operate the vehicle 102 and may receive at least some instructions from a remote operator or system via a wireless link. For example, the central controller 218 and the volume determination system 216 may be in communication with one or more central servers or remote devices and may receive instructions from the one or more central servers or remote devices. Moreover, the central controller 218 and the volume determination system 216 may send data (e.g., weight and/or volume data) to the one or more central servers or remote devices for display to a remote operator.

Figure 3:
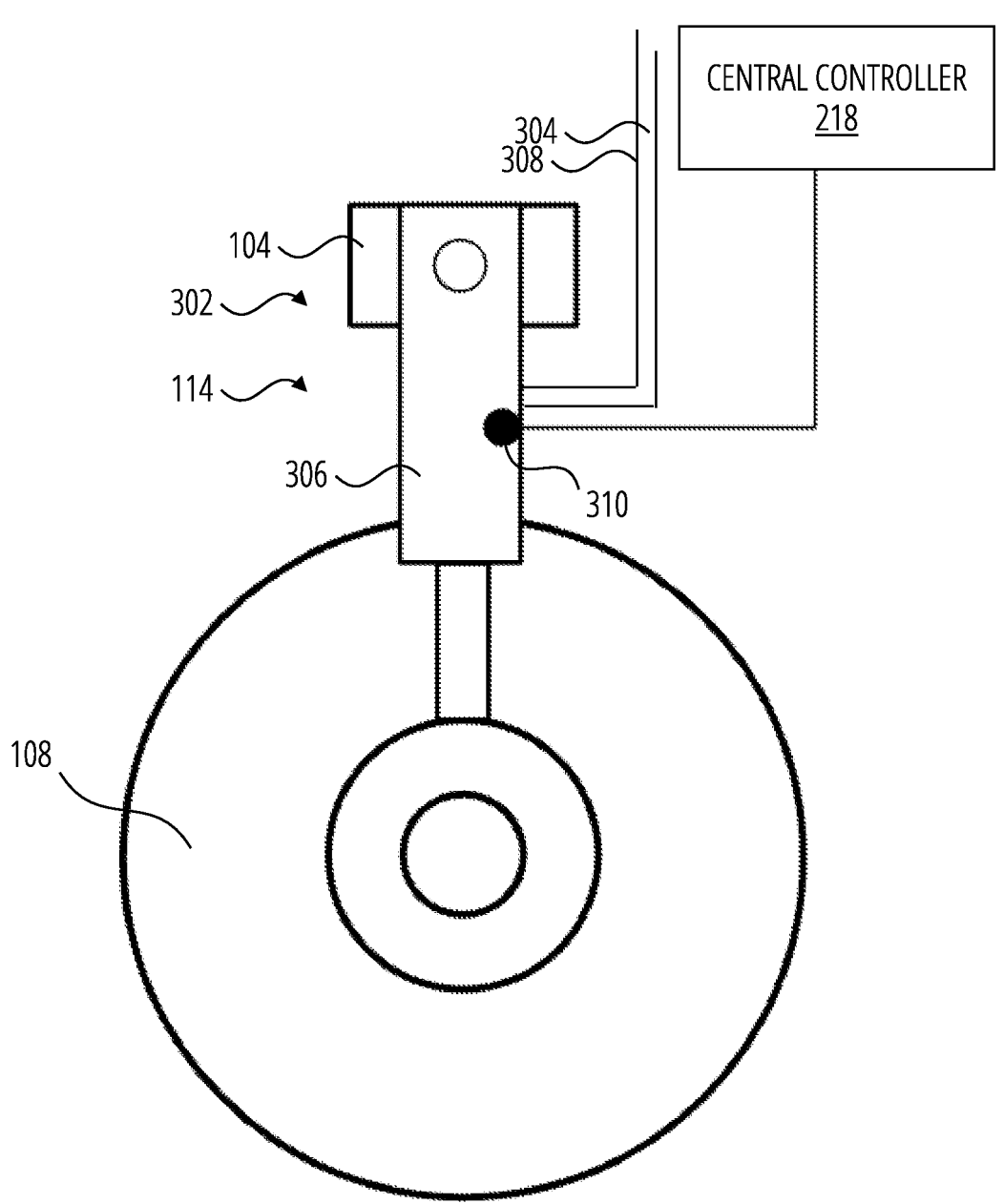
FIG. 3 shows a schematic representation of a suspension assembly of the vehicle according to one or more embodiments of the disclosure.

FIG. 3 shows a simplified view of a suspension assembly 114 of the vehicle 102 according to embodiments of the disclosure. In some embodiments, the suspension assembly 114 may include a hydraulic suspension system 302 that is mounted and interposed between the wheels 108 and the chassis support of the chassis 104. In some embodiments, the hydraulic suspension system 302 may include a pump for pressurizing a hydraulic fluid 304, at least one suspension cylinder 306, and one or more hydraulic lines 308 extending between the pump and the suspension cylinder 306. The suspension cylinder 306 may include a conventional suspension cylinder having a piston and a piston guide and may operate in conventional manners. The suspension assembly 114 may further include at least one pressure sensor 310 interfacing with the hydraulic fluid 304 within the hydraulic suspension system 302 and configured to measure a pressure of the hydraulic fluid 304. The at least one pressure sensor 310 may be operably coupled to the central controller 218 and may be configured to provide measurement data (e.g., pressure data) to the volume determination system 216 of the central controller 218. The at least one pressure sensor 310 may include any conventional pressure sensor or transducer, such as a piezo-resistive pressure sensor, a strain-gauge-based pressure sensor, or a capacitive pressure sensor.

While the suspension assembly 114 depicted in FIG. 3 only includes one suspension cylinder in a vertical orientation for simplicity, the disclosure is not so limited. Rather, the suspension assembly 114 may include multiple suspension cylinders each orientated in any orientation, and the at least one pressure sensor 310 may include multiple sensors. Furthermore, the suspension cylinders may be mounted via any known manners. As a non-limiting example, the suspension assembly 114 may include any of the support assemblies described in U.S. Pat. No. 9,079,470 B2, to Slawson, issued Jul. 14, 2015.

Referring still to FIG. 3, in some embodiments, the suspension assembly 114 may include a pneumatic suspension system including a pump and/or compressor and bellows. For example, the suspension assembly 114 may include any conventional vehicle pneumatic suspension system that utilizes a gas instead of a hydraulic fluid. In such embodiments, the at least one pressure sensor 310 may include a piezo-resistive pressure sensor, a strain-gauge-based pressure sensor, a capacitive pressure sensor, or a solid-state pressure sensor.

Figure 4:
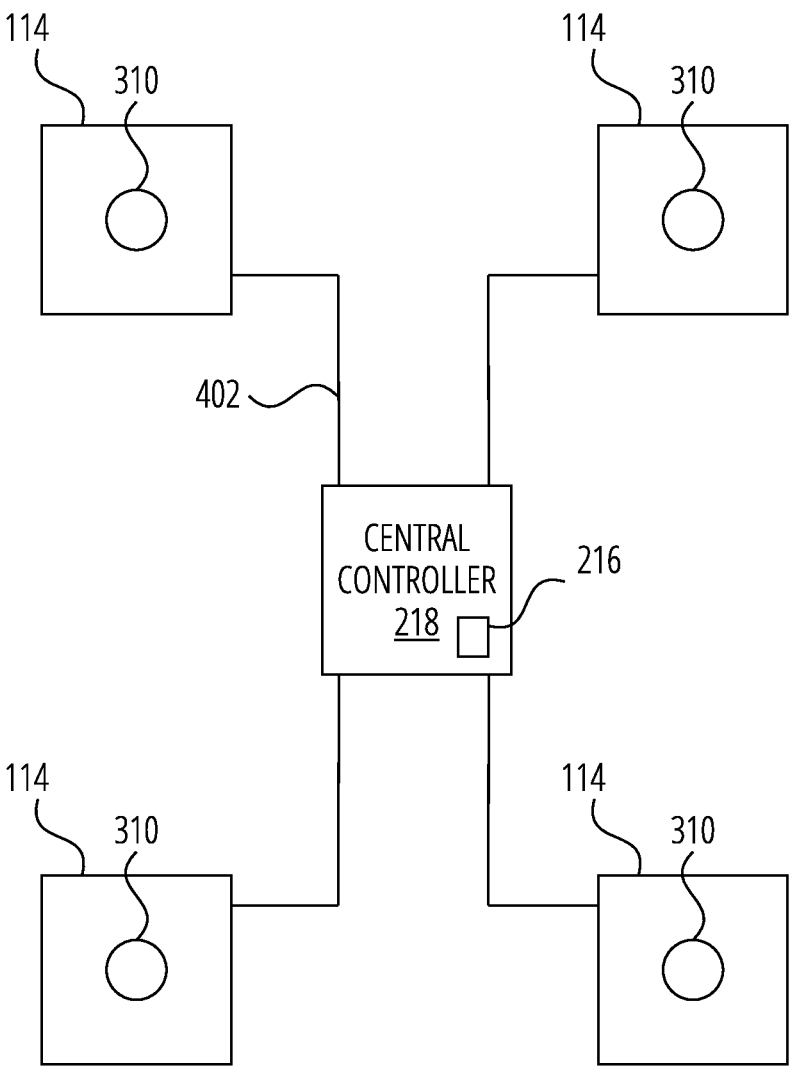
FIG. 4 shows a schematic representation of suspension assemblies and a central controller of the vehicle according to one or more embodiments of the disclosure.

FIG. 4 is a schematic of the central controller 218 having the volume determination system 216 and operably coupled to the suspension assemblies 114 of the vehicle 102. As depicted in FIG. 4, each of the suspension assemblies 114 of the vehicle 102 is operably coupled to the central controller 218 and, as a result, the volume determination system 216 via one or more communication lines 402. Furthermore, the pressure sensors 310 are configured to provide the measurement data to the volume determination system 216 of the central controller 218 via the communication lines 402.

FIG. 5 is a flowchart of a method 500 of operating a vehicle 102 with an application system 106 according to embodiments of the disclosure. As a non-limiting example, the method 500 may be performed subsequent to the holding tank 120 of the vehicle 102 being filled with a product and/or anytime during an application process (e.g., application of fertilizer) to determine an amount of product remaining in the holding tank 120 of the vehicle 102.

The method 500 may include receiving measurement data from the at least one pressure sensor 310 of the suspension assembly 114 of the vehicle 102, as shown in act 502 of FIG. 5. In some embodiments, the volume determination system 216 of the central controller 218 may receive the measurement data from the at least one pressure sensor 310 of the suspension assembly 114. In some embodiments, receiving measurement data may include receiving measurement data from suspension assemblies 114 of each axle of the vehicle 102 (e.g., the front axle 116 and the rear axle 118 of the vehicle 102). In some embodiments, receiving measurement data may include receiving measurement data from suspension assemblies 114 coupled to each wheel 108 of the vehicle 102. For instance, the volume determination system 216 of the central controller 218 may receive measurement data from at least three or at least four suspension assemblies 114.

In some embodiments, the measurement data may include data indicating a pressure (e.g., hydraulic or pneumatic pressure reading). For instance, in some embodiments, the measurement data may include an electrical signal that is filtered by the volume determination system 216 of the central controller 218 to determine a pressure measurement.

Based at least partially on the received measurement data, the method 500 may include determining a weight of the product within the holding tank 120, as shown in act 504 of FIG. 5. In some embodiments, the volume determination system 216 of the central controller 218 may determine the weight of the product within the holding tank 120. In some embodiments, the weight of the product may be determined based at least partially on known pressure measurements (e.g., pressure readings) of the at least one pressure sensor 310 when the holding tank 120 is empty (pressure measurements when empty) and the received measurement data when the holding tank 120 is loaded with the product. For instance, the weight of the product may be determined based on pressure differentials between pressure measurements when the holding tank 120 is empty and pressure measurements when the holding tank 120 contains the product. The weight may further be determined based at least partially on known geometry (e.g., surface areas of piston heads) of the suspension assemblies 114 and the pressure measurements.

In some embodiments, determining a weight of the product within the holding tank 120 may also include determining a weight on each axle of the vehicle 102 and/or determining a weight on each suspension assembly 114 of the vehicle 102.

The method 500 may further include, based at least partially on the determined weight of the product within the holding tank 120, determining a volume of the product within the holding tank 120, as shown in act 506 of FIG. 5. In some embodiments, the volume of the product within the holding tank 120 may be determined by the volume determination system 216 of the central controller 218. The volume of the product may be determined based on the determined weight of the product and a known density ($\rho$) of the product. For instance, the mass (m) of the product may be determined via m=w/g where w is the weight of the product and g is the acceleration of gravity. The volume may be determined via V=m/$\rho$.

Additionally, the method 500 may optionally include determining one or more product application implications (e.g., results, consequences, etc.) based at least partially on the determined volume of the product within the holding tank 120, as shown in act 508 of FIG. 5. For example, the volume determination system 216 of the central controller 218 may determine the one or more product application implications. In some embodiments, the implications may include one or more of an area that can be applied (e.g., treated, covered, fertilized, etc.) at a current application rate with a volume of product currently within the holding tank 120, a maximum recommended speed of the vehicle 102 permitted by the weight of product currently within the holding tank 120, or an amount of time remaining until a refill of product is needed (e.g., an estimated time to empty).

The method 500 may include causing weight data to be displayed within the operator cabin 110, as shown in act 510 of FIG. 5. For example, the volume determination system 216 of the central controller 218 may cause the weight data to be displayed within operator cabin 110. The weight data may include one or more of a current weight of product within the holding tank 120, a weight on each axle of the vehicle 102, or a weight on each suspension assembly 114. The weight data may be displayed on one or more of the electronic display panels 210 of the control environment 202 of the operator cabin 110. In some embodiments, the volume determination system 216 of the central controller 218 may cause the weight data to be displayed at and/or provided to a remote device (e.g., a server).

Furthermore, the method 500 may include causing the determined volume of the product within the holding tank 120 to be displayed within the operator cabin 110, as shown in act 512 of FIG. 5. For example, the volume determination system 216 of the central controller 218 may cause the volume of the product to be displayed within operator cabin 110. The volume of the product may be displayed on one or more of the electronic display panels 210 of the control environment 202 of the operator cabin 110. In some embodiments, the volume determination system 216 of the central controller 218 may cause the determined volume to be displayed at and/or provided to a remote device (e.g., a server).

The method 500 may optionally include causing one or more of the determined product application implications to be displayed within the operator cabin 110, as shown in act 512 of FIG. 5. For example, the volume determination system 216 of the central controller 218 may cause the determined product application implications to be displayed within operator cabin 110. The one or more determined product application implications may include an area that can be applied (e.g., treated, covered, fertilized, etc.) at a current application rate with a volume of product currently within the holding tank 120, a maximum recommended speed of the vehicle 102 permitted by the weight of product currently within the holding tank 120, and/or a an amount of time remaining until a refill of product is needed (e.g., a time to empty). The one or more determined product application implications may be displayed on one or more of the electronic display panels 210 of the control environment 202 of the operator cabin 110. In some embodiments, the volume determination system 216 of the central controller 218 may cause one or more of the determined product application implications to be displayed at and/or provided to a remote device (e.g., a server).

Referring still to FIG. 5, act 502 through act 514 may be iteratively or at least substantially continuously repeated. As a result of the foregoing, data displayed within the operator cabin 110 may be iteratively or at least substantially continuously updated. Moreover, the data displayed at and/or provided to a remote device (e.g., a server) may be iteratively or at least substantially continuously updated.

Additionally, the method 500 may optionally include adjusting operation of one or more of the vehicle 102 or the application system 106 based at least partially on the determined volume and/or weight of the product within the holding tank 120, as shown in act 516 of FIG. 5. For example, the central controller 218 may adjust operation of one or more of the vehicle 102 or the application system 106 based at least partially on the determined volume and/or weight of the product within the holding tank 120. In some embodiments, based at least partially on the determined volume and/or weight of the product within the holding tank 120, the method 500 may include limiting a top speed and/or a lower speed of the vehicle 102. In some embodiments, based at least partially on the determined volume and/or weight of the product within the holding tank 120, the method 500 may include adjusting an application rate (e.g., a rate at which product is applied to a field). In some embodiments, based at least partially on the determined volume and/or weight of the product within the holding tank 120, the method 500 may include scheduling the vehicle 102 to intercept a tender truck and/or a filling station at a given time (e.g., a given time in the future).

Referring still to FIG. 5, in embodiments where the central controller 218 limits the speed of the vehicle 102 due to a weight or a volume of product within the holding tank 120 of the vehicle 102, an upper limit and/or a lower limit on speed may be at least substantially continuously changed during an application process. For example, as the product is depleted within the holding tank 120, a minimum speed and/or a maximum speed at which the vehicle 102 can travel may be at least substantially continuously changed (e.g., increased or decreased) for at least some period of time.

Limiting the maximum speed and/or the minimum speed of the vehicle 102 during an application process may minimize damage to the vehicle 102 (e.g., an engine and/or transmission of the vehicle 102) during an application process. Furthermore, limiting the speeds of the vehicle 102 during an application process may minimize damage to a soil surface and/or crops upon which the vehicle 102 is traveling.

Referring to FIG. 1A through FIG. 5 together, the volume determination system 216 and the method 500 of determining a volume of a product within a holding tank 120 of the vehicle 102 of the disclosure may provide advantages over conventional vehicles with application systems and/or applicators for applying a product to a field or a crop. For example, during a refill process, the volume determination system 216 and method 500 described herein enable an operator to know when enough product has been loaded within the holding tank 120 to cover a given application process (e.g., a remaining number of acres). Furthermore, during application, the volume determination system 216 and method 500 enable an operator to know, from the operator cabin 110, whether the holding tank 120 has enough product remaining to cover the given application process (e.g., a remaining number of acres). Additionally, knowing a volume of product remaining within the holding tank 120 assists an operator with in-field operations and logistics of planning for tender trucks. Moreover, prior to road travel, the volume determination system 216 enables the operator to know whether the vehicle 102 is too heavy to travel on roadways and/or across a given bridge. Likewise, knowing the weight on the axles of the vehicle 102 will assist with on-road operations and enable the operator to determine whether the vehicle 102 is within compliance with roadway regulations.

Additionally, knowing a volume and/or weight of product remaining in a holding tank 120 of a vehicle 102 allows the operator to optimize logistics of tender trucks by avoiding having tender trucks wait for the operator to finish a current application process (e.g., field) before knowing whether the holding tank 120 has enough product remaining. Furthermore, knowing a volume and/or weight of product remaining in a holding tank 120 of a vehicle 102 allows the operator to send and/or hail a tender truck to refill if the holding tank 120 does not have enough remaining product for the current application process. Moreover, knowing a volume and/or weight of product remaining in a holding tank 120 of a vehicle 102 allows the operator to send an en-route tender truck to another vehicle (e.g., another field) rather than the vehicle 102 if additional product is not needed in order to finish a current application process. Likewise, knowing a volume and/or weight of product remaining in a holding tank 120 of a vehicle 102 allows the operator to divert a truck en-route to another vehicle (e.g., another field) to the vehicle 102 instead if additional product is required to finish a current application process.

Figure 6:
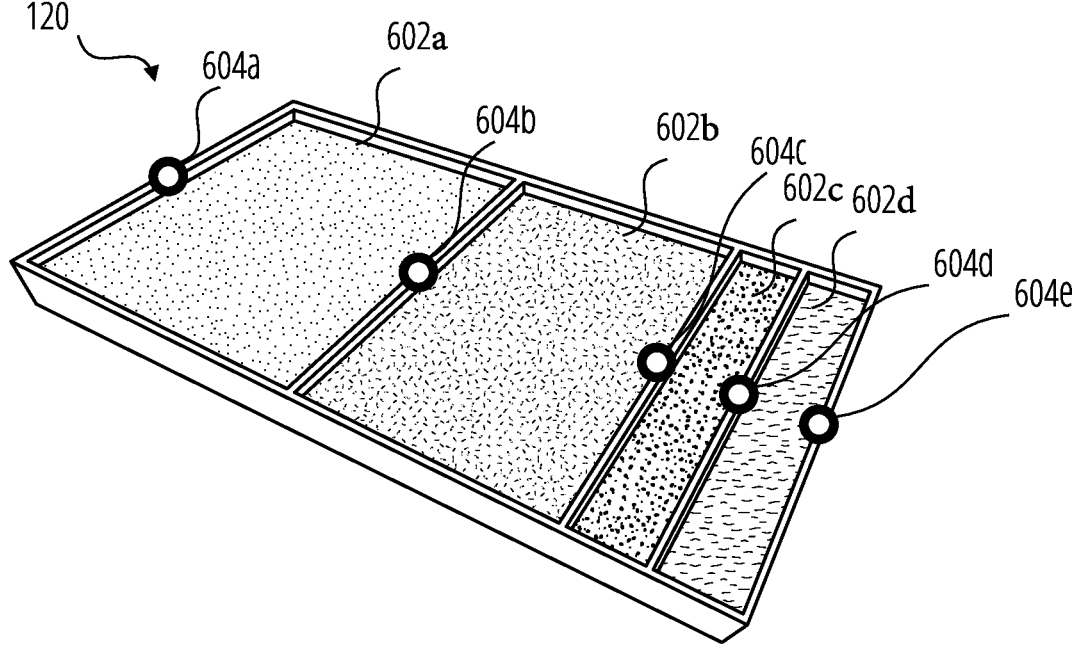
FIG. 6 shows a holding tank according to embodiments of the disclosure.

FIG. 6 shows a perspective view of a holding tank 120 according to one or more embodiments of the disclosure. In some embodiments, the holding tank 120 may include a plurality of discrete segments 602a-602c (referred to herein collectively as "602a"). Each segment 602a of the holding tank 120 may be configured to hold an individual product. For example, the segments 602a may be configured to hold one or more of fertilizer, soil amendments, herbicide, pesticide, fungicide, or any other product that can be or is typically applied to (e.g., distributed on) a field and/or crop during an agricultural process. Although the holding tank 120 if FIG. 6 is depicted as holding solid materials (e.g., as a solid material hopper), the disclosure is not so limited, and the holding tank 120 may include a liquid holding tank 120 with a plurality of segments 602a for holding individual liquids. In some embodiments, the holding tank 120 may include both segments 602a for solid materials and segments 602a for holding liquids.

Additionally, in some embodiments, the vehicle 102 may further include at least one imager system 604a-604e (referred to herein collectively with the reference numeral "604a"). The at least one imager system 604a may have one or more viewing angles encompassing a top and at least a portion of an interior of the holding tank 120, such that product within and/or entering the holding tank 120 can be viewed/detected by the at least one imager system 604a. In some embodiments, the at least one imager system 604a may be mounted to a top of the operator cabin 110 (FIG. 1A). In additional embodiments, the at least one imager system 604a may be mounted to one or more portions of the holding tank 120, such as an outer wall of the holding tank 120 and/or one or more walls between segments 602a of the holding tank 120. The at least one imager system 604a may be operably coupled to the volume determination system 216 (FIG. 2), which may be part of a central controller 218 (FIG. 2) of the vehicle 102, and the at least one imager system 604a may be at least partially operated by the volume determination system 216 (FIG. 2) and/or the central controller 218 (FIG. 2). The at least one imager system 604a may be configured to capture image data (e.g., image/video data) of one or more segments 602a of the holding tank 120 and product within and/or entering the one or more segments 602a of the holding tank 120. The at least one imager system 604a may be further configured to provide the image data (e.g., image/video data) to the volume determination system 216 (FIG. 2) of the central controller 218 (FIG. 2). Additionally, the volume determination system 216 (FIG. 2) may analyze and utilize the image data to detect a conveyor and/or an auger performing a filling process, detect product being disposed and/or already disposed within the holding tank 120, and identify when a filling process begins and/or ends for a given segment 602a of the holding tank 120.

In some embodiments, the at least one imager system 604a may include at least two imager systems 604a-604e. For instance, the imager system 604a may include a first imager system 604a coupled to a first portion of the operator cabin 110 and having a first viewing angle and a second imager system 604e coupled to a second portion of the operator cabin 110 and having a second, different viewing angle. As a non-limiting example, the first imager system 604a and the second imager system 604e may be orientated at different elevations. As another non-limiting example, the first imager system 604a may be disposed on first side of a central vertical plane extending from a front to a back of the vehicle 102, and the second imager system 604a may be disposed on an opposite, second side of the central vertical plane. For instance, the first and second imager systems 604a, 604e may be disposed on opposing sides of the top of the operator cabin 110 and may both face the holding tank 120 from different angles. As a result, the first imager system 604a and the second imager system 604e may at least partially triangulate one or more views of the interior of the holding tank 120. In yet further embodiments, the first imager system 604a may be disposed on the operator cabin 110 (e.g., proximate a front of the holding tank 120) and the second imager system 604e may be disposed on a rear wall of the holding tank 120 (e.g., proximate a back of the holding tank 120). For instance, the first imager system 604a and the second imager system 604e may face each other on opposing sides of the holding tank 120.

In some embodiments, the at least one imager system 604a may include a plurality of imager systems 604a-604e. For instance, the vehicle 102 may include an imager system 604a for each segment 602a of the holding tank 120. Furthermore, each imager system 604a may be associated with a respective segment 602a-602d.

Figure 7:
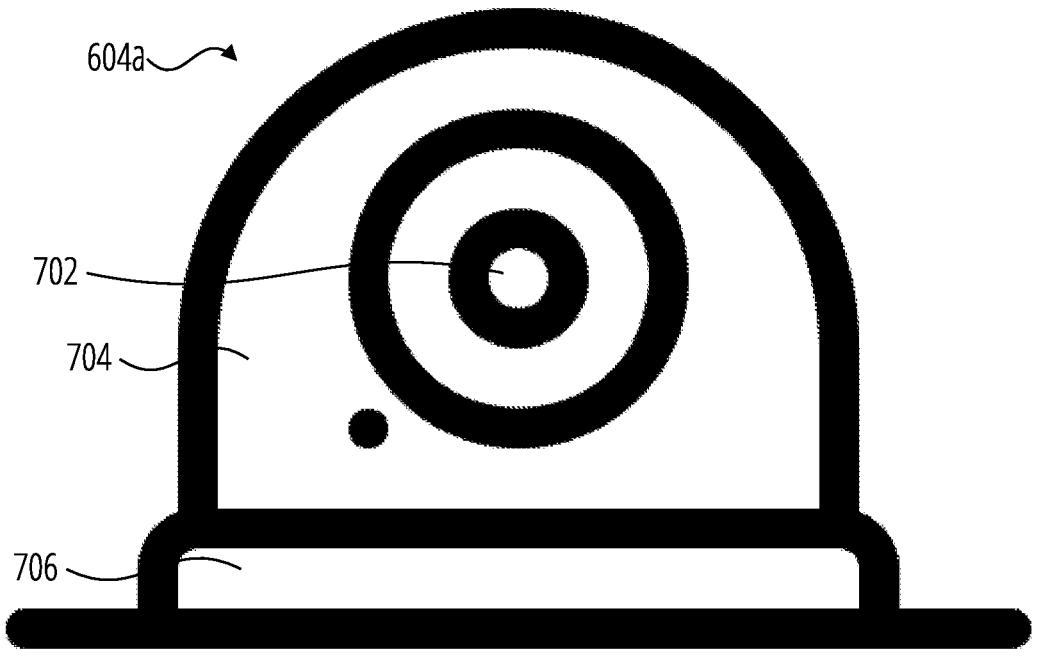
FIG. 7 shows a simplified view of an imager system according to one or more embodiments of the disclosure.

FIG. 7 is a schematic view of an imager system 604a according to one or more embodiments. As noted above, the imager system 604a may be mounted to the operator cabin 110 on the vehicle 102 and/or the holding tank 120 of the vehicle 102.

In some embodiments, the imager system 604a may include one or more lenses 702, a body 704, and one or more actuators 706. The one or more actuators 706 may facilitate manipulation of a position and a viewing angle of the one or more lenses 702 of the imager system 604a. In some embodiments, the one or more actuators 706 may be capable of rotating the one or more lenses 702 about at least two axes (e.g., an X-axis and a Z-axis). The actuator 706 may include one or more mechanical/electro mechanical actuators (e.g., linear actuators and/or rotary actuators). In some embodiments, the actuators 706 may be operated and controlled by the volume determination system 216.

In some embodiments, the imager system 604a may include one or more of a 3D laser scanner (LiDAR), a 2D laser scanner (LiDAR), an ultra-sonic distance sensor, a radar sensor, a charge-couple device (CCD) sensor, a complementary metal oxide semiconductor (CMOS) sensor, a stereoscopic camera, a monoscopic camera, an infrared (IR) camera, a short-wave infrared (SWIR) camera, or a digital single-reflex camera. Furthermore, the imager system 604a may be configured to capture data including one or more of relatively high resolution color images/video, relatively high resolution infrared images/video, or light detection and ranging data. In some embodiments, the imager system 604a may be configured to capture image data at multiple focal lengths. In some embodiments, the imager system 604a may be configured to combine multiple exposures into a single high-resolution image/video. In some embodiments, imager system 604a may include multiple image sensors (e.g., cameras) with viewing angles facing different directions.

Figure 8:
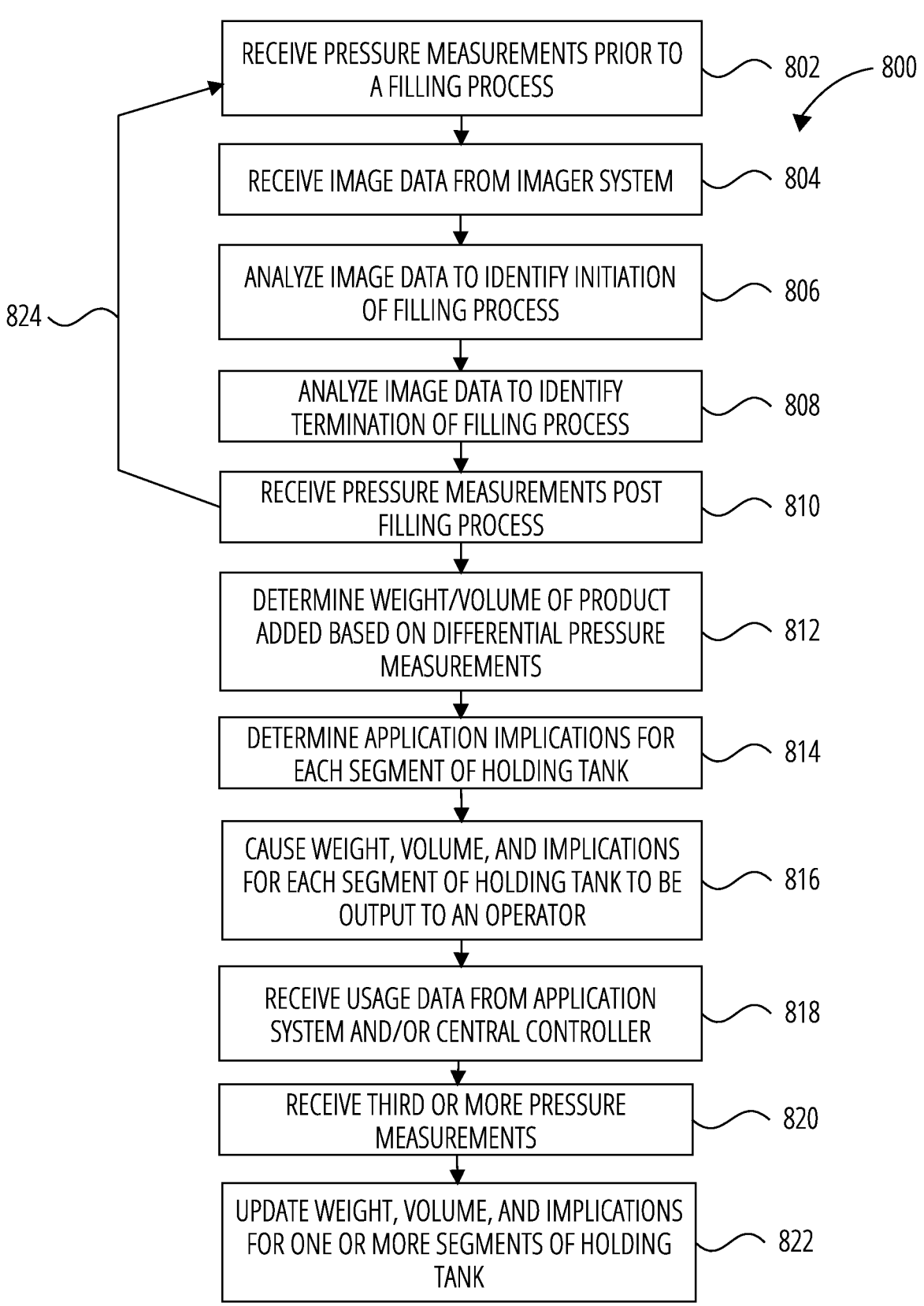
FIG. 8 shows a flowchart of a method of monitoring contents of a holding tank of a vehicle according to embodiments of the disclosure.

FIG. 8 shows a flowchart of a method 800 of monitoring contents of a holding tank 120 of a vehicle 102 according to embodiments of the disclosure. The method 800 may include receiving first pressure measurements from suspension assemblies 114 of the vehicle 102 having the holding tank 120 prior to a filling (e.g., a loading) process where product is added to one or more segments 602a-602d of the holding tank 120, as shown in act 802 of FIG. 8. For example, the volume determination system 216 may receive the first pressure measurements via any of the manners described above in regard to FIG. 5.

The method 800 may include receiving image data from the imager system 604a, as shown in act 804 of FIG. 8. For example, the volume determination system 216 may receive the image data from the imager system 604a. The image data may include one or more of images and/or video (e.g., video data) of one or more segments 602a-602d of the holding tank 120. The imager system 604a may include any of the imager systems 604a described above, and the imager system 604a may have captured the image data. In some embodiments, receiving the image data from the imager system 604a may be in response to an initiation of a process to fill one or more segments segment 602a-602d of the holding tank 120 with product (e.g., a refill process utilizing a tender truck or station and tender auger or conveyor). For instance, receiving the image data from the imager system 604a may be in response to the imager system 604a detecting that a filling process has been initiated. For instance, a filling process may be sensed automatically without operator input. In some embodiments, the imager system 604a may detect a conveyor and/or an auger over the holding tank 120. In additional embodiments, the imager system 604a may detect product being added to the holding tank 120. In yet further embodiments, the volume determination system 216 may at least substantially continuously receive image data from the imager system 604a while operating.

As noted above, in some embodiments, the vehicle 102 may include a plurality of imager systems 604a. In such embodiments, the volume determination system 216 may receive the image data from the plurality of imager systems 604a.

Responsive to receiving the image data, the method 800 may optionally include analyzing the image data to identify an initiation of a filling process of one or more segments 602a-602d of the holding tank 120, as shown in act 806 of FIG. 8. For example, the volume determination system 216 may analyze the image data to identify an initiation of a filling process of one or more segments 602a-602d of the holding tank 120. Identifying an initiation of a filling process of one or more segments 602a-602d of the holding tank 120 may include detecting when a product begins entering the one or more segments 602a-602d of the holding tank 120. Additionally, identifying an initiation of a filling process of one or more segments 602a-602d of the holding tank 120 may include detecting a conveyor and/or an auger over the one or more segments 602a, 602d. In some embodiments, identifying an initiation of a filling process of one or more segments 602a-602d of the holding tank 120 may include distinguishing the product from the structure of the holding tank 120.

In some embodiments, act 804 and act 806 may be at least substantially continuously repeated. In other words, the volume determination system 216 may be at least substantially continuously analyzing image data received from the one or more imager systems 604a to identify initiations of filling processes. Additionally, in some embodiments, the volume determination system 216 may identify which segments segment 602a-602d of the holding tank 120 are currently being filled during the filling processes. For instance, the volume determination system 216 may identify which segments segment 602a-602d of the holding tank 120 are currently being filled based on detection of product entering (e.g., being added to) the one or more segments 602a-602d of the holding tank 120 and/or detection of the conveyor and/or auger above the one or more segments 602a-602d of the holding tank 120.

In some embodiments, the volume determination system 216 analyze the image data via deep learning techniques to identify initiation of a filling process. For example, the volume determination system 216 may utilize one or more of convolutional neural networks (CNNs), single shot detectors (SSDs), region-convolutional neural networks (R-CNNs), Faster R-CNN, Region-based Fully Convolutional Networks (R-FCNs) and other machine learning models to perform the product (e.g., object) detection and classification. The foregoing models may be trained according to conventional methods to perform the product detection, initiations of filling processes, and classification. In some embodiments, the volume determination system 216 may determine bounding boxes (e.g., a point, width, and height) of the identified product and/or the holding tank 120. In additional embodiments, the volume determination system 216 may perform object segmentation (e.g., object instance segmentation or sematic segmentation) to associate specific pixels of the image data with the detected product and/or the holding tank 120.

As noted above, in some embodiments, the vehicle 102 may include a plurality of imager systems 604a. In such embodiments, the volume determination system 216 may analyze image data received from the plurality of imager systems 604a. Furthermore, the volume determination system 216 may identify initiations of a plurality of different filling processes. For instance, in some embodiments, multiple segments 602a-602d of the holding tank 120 may be filled simultaneously, and the volume determination system 216 may identify a respective initiation of a filling process for each segment 602a-602d of the holding tank 120.

Additionally, the method 800 may include analyzing the image data to identify a termination of a filling process of the one or more segments 602a-602d of the holding tank 120, as shown in act 808 of FIG. 8. For example, the volume determination system 216 may analyze the received image data to identify a termination of a filling process of the one or more segments 602a-602d of the holding tank 120. The volume determination system 216 may analyze the image data via any of the manners described above in regard to act 806 of FIG. 8.

In some embodiments, act 808 may be initiated responsive to an identification of an initiation of a filling process of one or more segments 602a-602d of the holding tank 120. For example, for an imager system 604a via which an initiation of a filling process of one or more segments 602a-602d of the holding tank 120 has been detected, the volume determination system 216 may begin to analyze image data received from the imager system 604a to identify when the filling process terminates. Furthermore, act 808 may be at least substantially continuous once an initiation of the filling process has been identified.

As noted above, in some embodiments, the vehicle 102 may include a plurality of imager systems 604a-604e. In such embodiments, the volume determination system 216 may analyze image data received from the plurality of imager systems 604a-604e to identify terminations of filling processes. Furthermore, the volume determination system 216 may identify terminations of a plurality of different filling processes. For instance, in some embodiments, multiple segments 602a-602d of the holding tank 120 may be filled simultaneously, and the volume determination system 216 may identify a respective termination of each filling process.

The method 800 may further include, responsive to detecting that a filling process is complete (e.g., has terminated), receiving second pressure measurements from suspension assemblies 114 of the vehicle 102 having the holding tank 120, as shown in act 810 of FIG. 8. For example, the volume determination system 216 may receive the second pressure measurements via any of the manners described above in regard to FIG. 5. In some embodiments, act 810 occurs automatically in response to an identification of a termination of a filling process.

As shown in FIG. 8, the method 800 may include repeating act 802 through act 810 for any number of segments 602a-602d of the holding tank 120. Furthermore, in some embodiments, the method 800 may include performing acts 802 through act 810 for multiple segments 602a-602d simultaneously.

Furthermore, the method 800 may include determining a weight and/or a volume of product added to the selected at least one segment 602a during the filling process based on differential pressure measurements between the first pressure measurements and the second pressure measurements, as shown in act 812 of FIG. 8. For instance, the weight and/or the volume of the product added to the selected at least one segment 602a may be determined via any of the manners described above in regard to FIG. 5.

Moreover, the method 800 may include determining application implications (e.g., results, consequences, etc.) for each segment 602a of the holding tank 120 based at least partially on the determined volumes of products within each segment 602a of the holding tank 120 as shown in act 814 of FIG. 8. The application implications may be determined via any of the manners described above in regard to FIG. 5. Furthermore, the application implications may include one or more of an area that can be applied (e.g., treated, covered, fertilized, etc.) at a current application rate with a volume of product currently within a given segment 602a of the holding tank 120 or an amount of time remaining until a refill of product is needed (e.g., an estimated time to empty) for a given segment 602a of the holding tank 120.

The method 800 may also include causing the determined weight, the determined volume, and/or any of the determined application implications for each segment 602a of the holding tank 120 to be output to an operator, as shown in act 816 of FIG. 8. For instance, the volume determination system 216 may cause the determined weight, the determined volume, and/or any of the determined application implications for each segment 602a of the holding tank 120 to be output to an operator via any of the manners described above in regard to FIG. 5. As a non-limiting example, the volume determination system 216 may cause the determined weight, the determined volume, and/or any of the determined application implications for each segment 602a of the holding tank 120 to be output to an operator via one or more of the display panels 210 of the operator cabin 110 of the vehicle 102. Furthermore, causing the determined weight, the determined volume, and/or any of the determined application implications for each segment 602a of the holding tank 120 to be output to an operator may include associating the determined weight, the determined volume, and/or any of the determined application implications for each segment 602a within the output (e.g., within the display panel 210 of the operator cabin 110).

Also, the method 800 may optionally include receiving usage data from the application system 106 and/or the central controller 218 of the vehicle 102, as shown in act 818 of FIG. 8. For example, the volume determination system 216 may receive the usage data from the application system 106 and/or the central controller 218. In some embodiments, the usage data may include one or more of when (e.g., a start and stop time of when, a time period for which) a given product is being applied, from which segment 602a a given product is being applied, or an application rate at which the product is being applied or was applied.

Additionally, the method 800 may optionally include receiving third or more pressure measurements from suspension assemblies 114 of the vehicle 102 having the holding tank 120, as shown in act 820 of FIG. 8. For example, the volume determination system 216 may receive the second pressure measurements via any of the manners described above in regard to FIG. 5. In some embodiments, the method 800 may include iteratively or at least substantially continuously receiving pressure measurements from suspension assemblies 114 of the vehicle 102.

Moreover, the method 800 may optionally include updating one or more of a determined weight of a product of a given segment, a determined volume of a product of a given segment, or determined application implications for a product of a given segment, as shown in act 822 of FIG. 8. In some embodiments, the volume determination system 216 may update one or more of a determined weight of, a determined volume of, or determined application implications for a product of a given segment based at least partially on the received usage data and/or the received third or more pressure measurements. Furthermore, the volume determination system 216 may cause the updated weight, volume, and/or application implications to be output to an operator. In some embodiments, the updated weight, volume, and/or application implications may be output to an operator via one or more display panels 210 of the operator cabin 110.

Referring still to FIG. 8, act 802 through act 824 may be iteratively or at least substantially continuously repeated. As a result of the foregoing, data (e.g., a determined weight of, a determined volume of, or determined application implications for a product of a given segment) displayed within the operator cabin 110 may be iteratively or at least substantially continuously updated. Moreover, the data displayed at and/or provided to a remote device (e.g., a server) may be iteratively or at least substantially continuously updated.

Furthermore, method 800 may include any of the acts described above in regard to method 500 and FIG. 5. For example, method 800 may include optionally include adjusting operation of one or more of the vehicle 102 or the application system 106 based at least partially on the determined volume and/or weight of a product within a given segment 602a of the holding tank 120.

Figure 9:
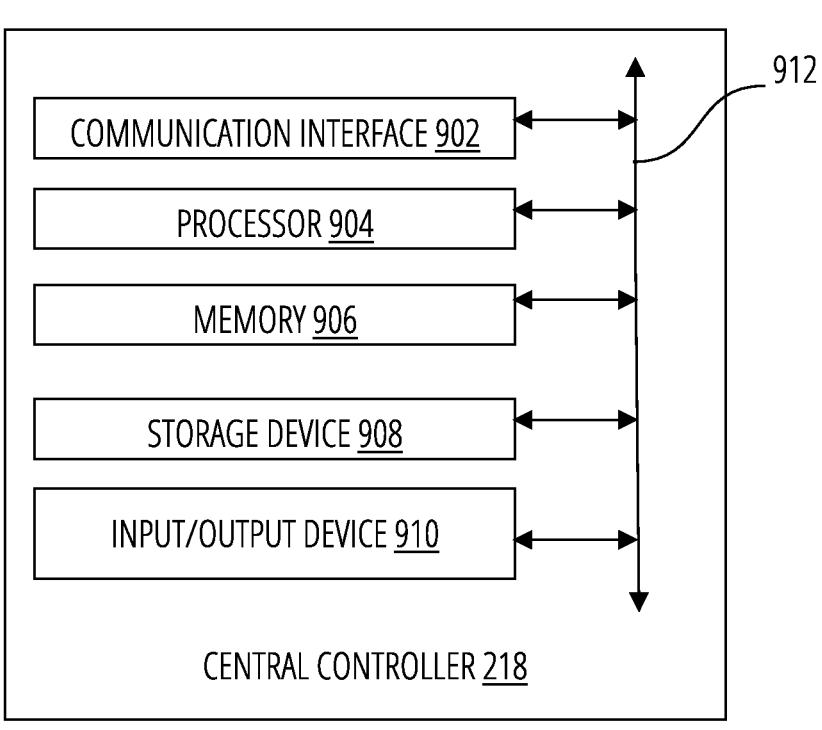
FIG. 9 is a schematic view of a central controller according to embodiments of the disclosure.

FIG. 9 is a schematic view of the central controller 218, which may at least partially operate the vehicle 102 and application system 106 according to some embodiments of the disclosure. The central controller 218 may include a communication interface 902, a processor 904, a memory 906, a storage device 908, an input/output device 910, and a bus 912.

In some embodiments, the processor 904 includes hardware for executing instructions, such as those making up a computer program. As an example, and not by way of limitation, to execute instructions, the processor 904 may retrieve (or fetch) the instructions from an internal register, an internal cache, the memory 906, or the storage device 908 and decode and execute them. In some embodiments, the processor 904 may include one or more internal caches for data, instructions, or addresses. As an example, and not by way of limitation, the processor 904 may include one or more instruction caches, one or more data caches, and one or more translation look aside buffers (TLBs). Instructions in the instruction caches may be copies of instructions in the memory 906 or the storage device 908.

The memory 906 may be coupled to the processor 904. The memory 906 may be used for storing data, metadata, and programs for execution by the processor(s). The memory 906 may include one or more of volatile and non-volatile memories, such as Random-Access Memory ("RAM"), Read-Only Memory ("ROM"), a solid state disk ("SSD"), Flash, Phase Change Memory ("PCM"), or other types of data storage. The memory 906 may be internal or distributed memory.

The storage device 908 may include storage for storing data or instructions. As an example, and not by way of limitation, storage device 908 can comprise a non-transitory storage medium described above. The storage device 908 may include a hard disk drive (HDD), Flash memory, an optical disc, a magneto-optical disc, magnetic tape, or a Universal Serial Bus (USB) drive or a combination of two or more of these. The storage device 908 may include removable or non-removable (or fixed) media, where appropriate. The storage device 908 may be internal or external to the computing storage device 908. In one or more embodiments, the storage device 908 is non-volatile, solid-state memory. In other embodiments, the storage device 908 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or Flash memory or a combination of two or more of these.

The input/output device 910 may allow an operator of the vehicle 102 to provide input to, receive output from, and otherwise transfer data to and receive data from central controller 218. The input/output device 910 may include a mouse, a keypad or a keyboard, a joystick, a touch screen, a camera, an optical scanner, network interface, modem, other known I/O devices, or a combination of such I/O interfaces. The input/output device 910 may include one or more devices for presenting output to an operator, including, but not limited to, a graphics engine, a display (e.g., a display screen), one or more output drivers (e.g., display drivers), one or more audio speakers, and one or more audio drivers. In certain embodiments, the input/output device 910 is configured to provide graphical data to a display for presentation to an operator. For instance, the input/output device 910 may include the display panel 210 of the operator cabin 110. The graphical data may be representative of one or more graphical user interfaces and/or any other graphical content as may serve a particular implementation. As is described above, the central controller 218 and the input/output device 910 may be utilized to display data (e.g., images and/or video data) received from the at least one pressure sensor 310 and provide (e.g., display) weight and/or volume data to assist an operator in operating the vehicle 102 and the application system 106.

The communication interface 902 can include hardware, software, or both. The communication interface 902 may provide one or more interfaces for communication (such as, for example, packet-based communication) between the central controller 218 and one or more other computing devices or networks (e.g., a server) and the at least one pressure sensor 310. As an example, and not by way of limitation, the communication interface 902 may include a network interface controller (NIC) or network adapter for communicating with an Ethernet or other wire-based network or a wireless NIC (WNIC) or wireless adapter for communicating with a wireless network, such as a WI-FI.

In some embodiments, the bus 912 (e.g., a Controller Area Network (CAN) bus) may include hardware, software, or both that couples components of central controller 218 to each other and to external components.

All references cited herein are incorporated herein in their entireties. If there is a conflict between definitions herein and in an incorporated reference, the definition herein shall control.

The embodiments of the disclosure described above and illustrated in the accompanying drawings do not limit the scope of the disclosure, which is encompassed by the scope of the appended claims and their legal equivalents. Any equivalent embodiments are within the scope of this disclosure. Indeed, various modifications of the disclosure, in addition to those shown and described herein, such as alternate useful combinations of the elements described, will become apparent to those skilled in the art from the description. Such modifications and embodiments also fall within the scope of the appended claims and equivalents.

What is claimed is:

1. A vehicle, comprising:
   a holding tank comprising a plurality of segments, each segment configured to hold an individual product;
   a plurality of suspension assemblies supporting the vehicle; and
   a volume determination system comprising:
      at least one processor; and
      at least one non-transitory computer-readable storage medium storing instructions thereon that, when executed by the at least one processor, cause the volume determination system to:
         receive image data from at least one imager system of the vehicle during a first filling process of a first segment of the plurality of segments of the holding tank;
         analyze the received image data to identify a termination of the first filling process of the first segment of the plurality of segments of the holding tank;
         responsive to identifying the termination of the first filling process, receive first pressure measurements from the plurality of suspension assemblies;
         based at least partially on the received first pressure measurements, determine a volume of a first product within the first segment of the plurality of segments of the holding tank; and cause the determined volume of the product within the first segment of the plurality of segments to be output to an operator of the vehicle.

2. The vehicle of claim 1, wherein the volume determination system further comprises instructions that, when executed by the at least one processor, cause the volume determination system to:

analyze the received image data to identify an initiation of a second filling process of a second segment of the plurality of segments of the holding tank;

analyze the received image data to identify a termination of the second filling process of the second segment of the plurality of segments of the holding tank;

responsive to identifying the termination of the second filling process, receive second pressure measurements from the plurality of suspension assemblies;

based at least partially on the received second pressure measurements, determine a volume of the second product within the second segment of the plurality of segments of the holding tank; and cause the determined volume of the second product within the second segment of the plurality of segments to be output to the operator of the vehicle.

3. The vehicle of claim 1, wherein the volume determination system further comprises instructions that, when executed by the at least one processor, cause the volume determination system to cause the determined volume of the first product within the first segment of the plurality of segments to be displayed on a display panel of an operator cabin.

4. The vehicle of claim 1, wherein each suspension assembly of the plurality of suspension assemblies comprises:

at least one suspension cylinder mounted between a chassis and a respective ground-engaging element of the vehicle;

a hydraulic fluid;

a pump for pressurizing the hydraulic fluid within the at least one suspension cylinder; and at least one pressure sensor interfacing with the hydraulic fluid and operably coupled to the volume determination system.

5. The vehicle of claim 1, wherein the volume determination system further comprises instructions that, when executed by the at least one processor, cause the volume determination system to receive pressure measurements prior to the first filling process.

6. The vehicle of claim 1, wherein determining the volume of the first product within the first segment of the plurality of segments of the holding tank of the vehicle comprises determining the volume of the first product within the first segment of the holding tank of the vehicle based at least partially on a known density of the first product.

7. The vehicle of claim 1, wherein the volume determination system further comprises instructions that, when executed by the at least one processor, cause the volume determination system to adjust operation of the vehicle based at least partially on the determined volume of the first product within the first segment of the plurality of segments of the holding tank.

8. The vehicle of claim 1, wherein the volume determination system further comprises instructions that, when executed by the at least one processor, cause the volume determination system to provide volume data to a remote device.

9. The vehicle of claim 1, wherein the volume determination system further comprises instructions that, when executed by the at least one processor, cause the volume determination system to determine an area over which the first product can be applied based at least partially on the determined volume of the first product within the first segment of the plurality of segments of the holding tank.

10. The vehicle of claim 1, wherein the volume determination system further comprises instructions that, when executed by the at least one processor, cause the volume determination system to receive usage data related to an application of the first product during an application process.

11. The vehicle of claim 10, wherein receiving usage data related to the application of the first product comprises receiving data related to at least one of a time period for which the first product has been applied or an application rate at which the first product has been applied.

12. The vehicle of claim 11, wherein the volume determination system further comprises instructions that, when executed by the at least one processor, cause the volume determination system to receive third pressure measurements from the plurality of suspension assemblies after the application of the first product.

13. The vehicle of claim 12, wherein the volume determination system further comprises instructions that, when executed by the at least one processor, cause the volume determination system to update the determined volume of the first product based at least partially on the received third pressure measurements and the received usage data related to the application of the first product.

14. A method, comprising:

receiving image data from an imager system mounted to a holding tank of the vehicle;

analyzing the received image data to identify an initiation of a first process of filling a first segment of the holding tank of the vehicle with a first product;

analyzing the received image data to identify a termination of the first process of filling the first segment of the holding tank of the vehicle;

responsive to identifying the termination of the first process of filling the first segment, receiving first pressure data from suspension assemblies of the vehicle;

based at least partially on the received first pressure data, determining a volume of the first product within the first segment of the holding tank of the vehicle; and causing the determined volume of the first product to be output to an operator.

15. The method of claim 14, further comprising:

analyzing the received image data to identify an initiation of a second process of filling a second segment of the holding tank of the vehicle with a second product;

analyzing the received image data to identify a termination of the second process of filling the second segment of the holding tank of the vehicle;

responsive to identifying the termination of the second process of filling the first segment, receiving second pressure data from the suspension assemblies of the vehicle;

based at least partially on the received second pressure data, determining a volume of the second product within the second segment of the holding tank of the vehicle; and causing the determined volume of the second product to be output to the operator.

16. The method of claim 14, wherein causing the determined volume of the first product to be output to the operator comprises causing the determined volume of the first product to be output within an operator cabin.

17. The method of claim 14, wherein causing the determined volume of the first product to be output to the operator comprises causing the determined volume of the first product to be output via a device remote from the vehicle.

18. The method of claim 14, further comprising:

at least substantially continuously receiving updated pressure data; and at least substantially continuously updating the determined volume of the first product.

19. The method of claim 14, wherein causing the determined volume of the first product to be output to the operator comprises causing the determined volume of the first product to be displayed on a display panel and to be associated with the first segment of the holding tank on the display panel.

*     *     *     *     *